United States Patent
Fang

(10) Patent No.: US 11,686,806 B2
(45) Date of Patent: Jun. 27, 2023

(54) GEOLOCATIONING SYSTEM AND METHOD FOR USE OF SAME

(71) Applicant: Enseo, Inc., Plano, TX (US)

(72) Inventor: William C. Fang, Plano, TX (US)

(73) Assignee: Enseo, LLC, Plano, TX (US)

( * ) Notice: Subject to any disclaimer, the term of this patent is extended or adjusted under 35 U.S.C. 154(b) by 227 days.

(21) Appl. No.: 16/925,536

(22) Filed: Jul. 10, 2020

(65) Prior Publication Data

US 2021/0011112 A1   Jan. 14, 2021

Related U.S. Application Data

(60) Provisional application No. 62/873,375, filed on Jul. 12, 2019.

(51) Int. Cl.
*G01S 5/02* (2010.01)
*G01S 5/00* (2006.01)

(52) U.S. Cl.
CPC ........ *G01S 5/02213* (2020.05); *G01S 5/0009* (2013.01)

(58) Field of Classification Search
CPC ... G01S 5/02213; G01S 5/0221; G01S 5/0009
See application file for complete search history.

(56) References Cited

U.S. PATENT DOCUMENTS

| | | | |
|---|---|---|---|
| 8,285,681 B2 | 10/2012 | Prahlad et al. | |
| 8,914,837 B2 | 12/2014 | Ahmed et al. | |
| 9,037,667 B2 | 5/2015 | Rivkin | |
| 9,411,973 B2 | 8/2016 | Factor et al. | |
| 9,517,410 B2 | 12/2016 | Ahiska et al. | |
| 10,491,714 B2 | 11/2019 | Peng et al. | |
| 2011/0309931 A1* | 12/2011 | Rose | G01S 5/0009 340/572.1 |
| 2012/0047339 A1 | 2/2012 | Decasper et al. | |
| 2016/0066137 A1* | 3/2016 | Kulkarni | G01S 5/0221 455/456.1 |
| 2017/0059687 A1* | 3/2017 | Dinesh | H04W 64/00 |
| 2017/0193003 A1 | 7/2017 | Vijayan et al. | |
| 2018/0285202 A1 | 10/2018 | Bhagi et al. | |
| 2020/0044693 A1* | 2/2020 | Pei | G01S 5/0009 |

* cited by examiner

*Primary Examiner* — Cassi J Galt
(74) *Attorney, Agent, or Firm* — Scott Griggs; Griggs Bergen LLP

(57) ABSTRACT

A geolocationing system and method for providing awareness in a multi-space environment, such as a hospitality environment or educational environment, are presented. In one embodiment of the geolocationing system, a vertical and horizontal array of gateway devices is provided. Each gateway device includes a gateway device identification providing an accurately-known fixed location within the multi-space environment. Each gateway device includes a wireless transceiver that receives a beacon signal from a proximate wireless-enabled personal locator device. The gateway devices, in turn, send gateway signals to a server system having a redundant architecture, which determines estimated location of the wireless-enabled personal locator device.

17 Claims, 11 Drawing Sheets

GEOLOCATIONING SYSTEM AND METHOD FOR USE OF SAME

PRIORITY STATEMENT & CROSS-REFERENCE TO RELATED APPLICATIONS

This application claims priority from co-pending U.S. Patent Application No. 62/873,375, entitled "Geolocating System and Method for Use of Same" and filed on Jul. 12, 2019, in the name of William C. Fang; which is hereby incorporated by reference, in entirety, for all purposes.

TECHNICAL FIELD OF THE INVENTION

This invention relates, in general, to geolocationing and, in particular, to enhanced performance in systems and methods for providing awareness and safety in a multi-room environment such as a hospitality environment, educational environment or the like.

BACKGROUND OF THE INVENTION

Without limiting the scope of the present invention, the background will be described in relation to employee safety in hospitality environments, as an example. Employees face increased personal security risks at work in multi-room environments such as hospitality environments, which include motels, hotels, and the like, for example. Such hospitality industry employees often work alone and range over large interior areas that may be divided into many small, closed spaces. As a result of limited existing security measures, there is a need for improved systems and methods of providing awareness and safety in hospitality environments.

SUMMARY OF THE INVENTION

It would be advantageous to achieve systems and methods for providing geolocationing in a multi-room environment such as a hospitality environment, educational environment, or the like that would improve upon existing limitations in functionality. It would be desirable to enable an electrical engineering-based and software solution that would provide enhanced awareness and safety in an easy-to-use platform in the hospitality lodging industry or in another environment. To better address one or more of these concerns, a geolocationing system and method for use of the same are disclosed.

In one embodiment of the geolocationing system, a vertical and horizontal array of gateway devices is provided. Each gateway device includes a gateway device identification providing an accurately-known fixed location within the multi-space environment. Each gateway device includes a wireless transceiver that receives a beacon signal from a proximate wireless-enabled personal locator device. The gateway devices, in turn, send gateway signals to send gateway signals to a server system having a redundant architecture, which determines estimated location of the wireless-enabled personal locator device. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

Figure 1A:
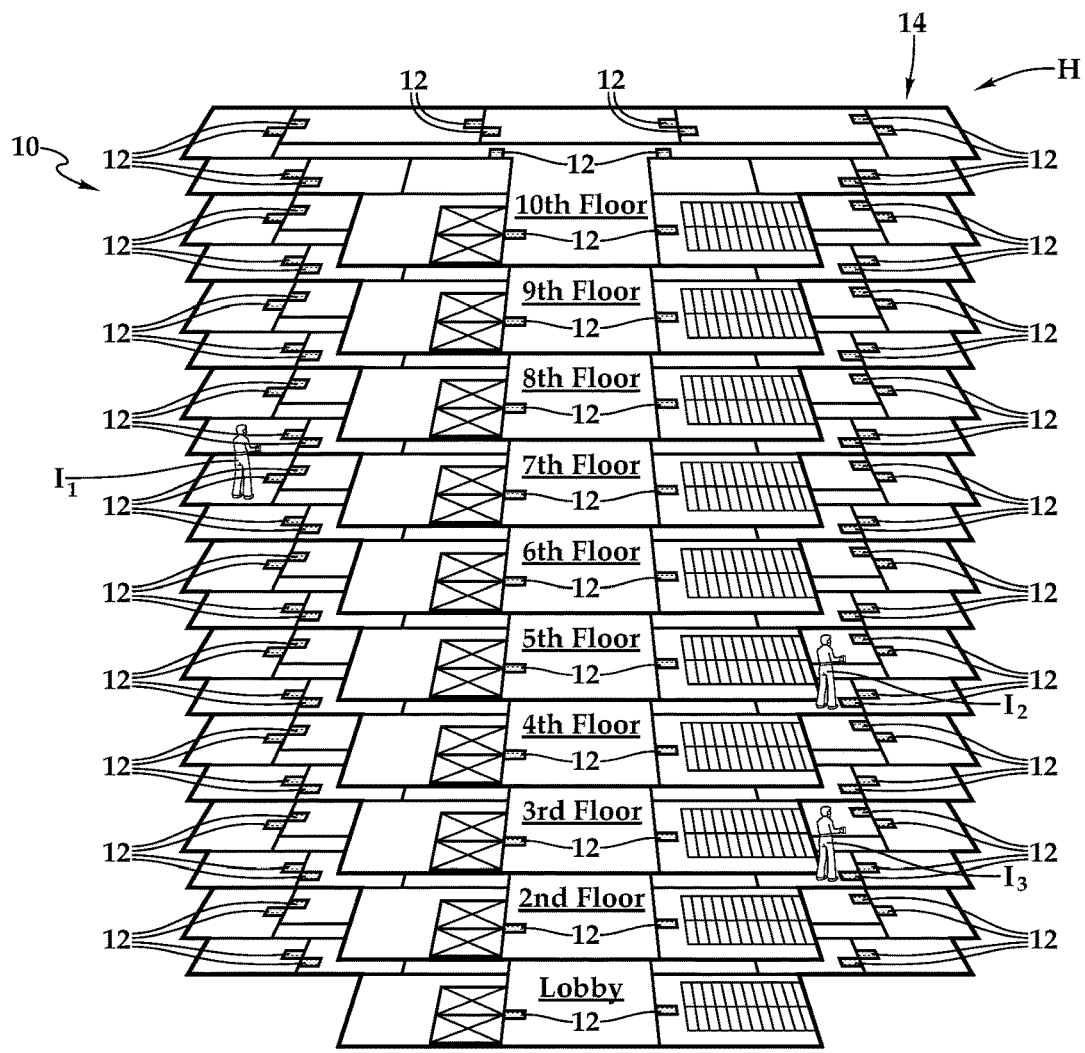
FIG. 1A is a schematic building diagram depicting one embodiment of a geolocationing system for providing awareness in a multi-room environment illustrated as a hotel, according to the teachings presented herein.
Figure 1B:
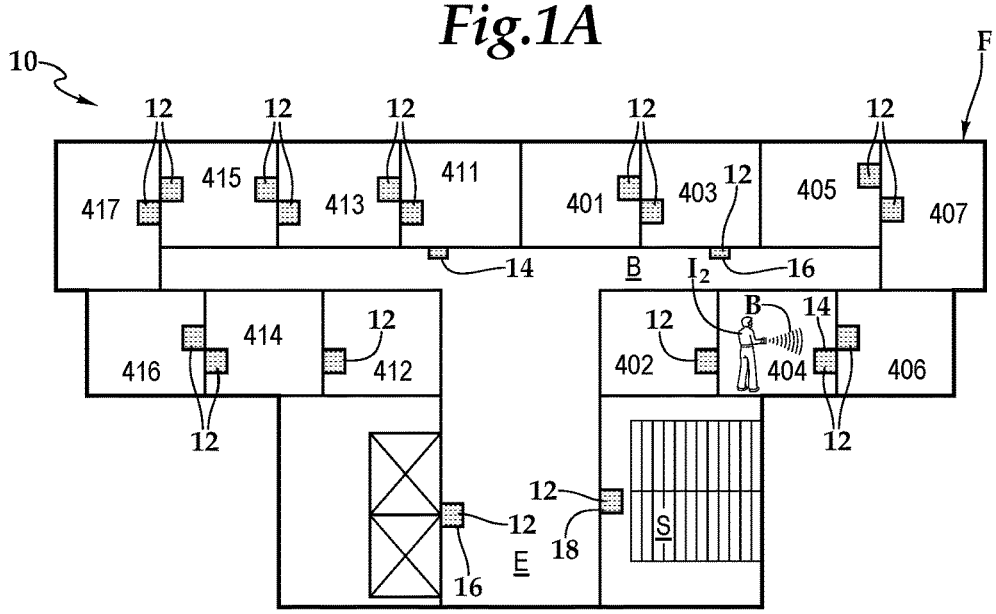
FIG. 1B is a schematic floor plan depicting a floor of the hotel presented in FIG. 1A in further detail.
Figure 1C:
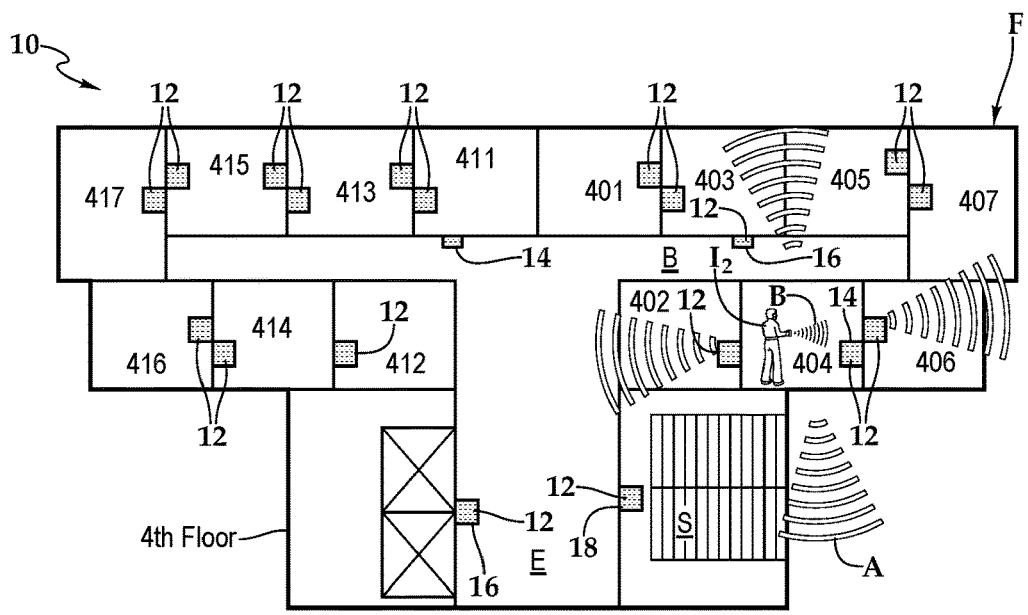
FIG. 1C is a schematic floor plan depicting a floor of the hotel presented in FIG. 1A during an alert event.
Figure 2:
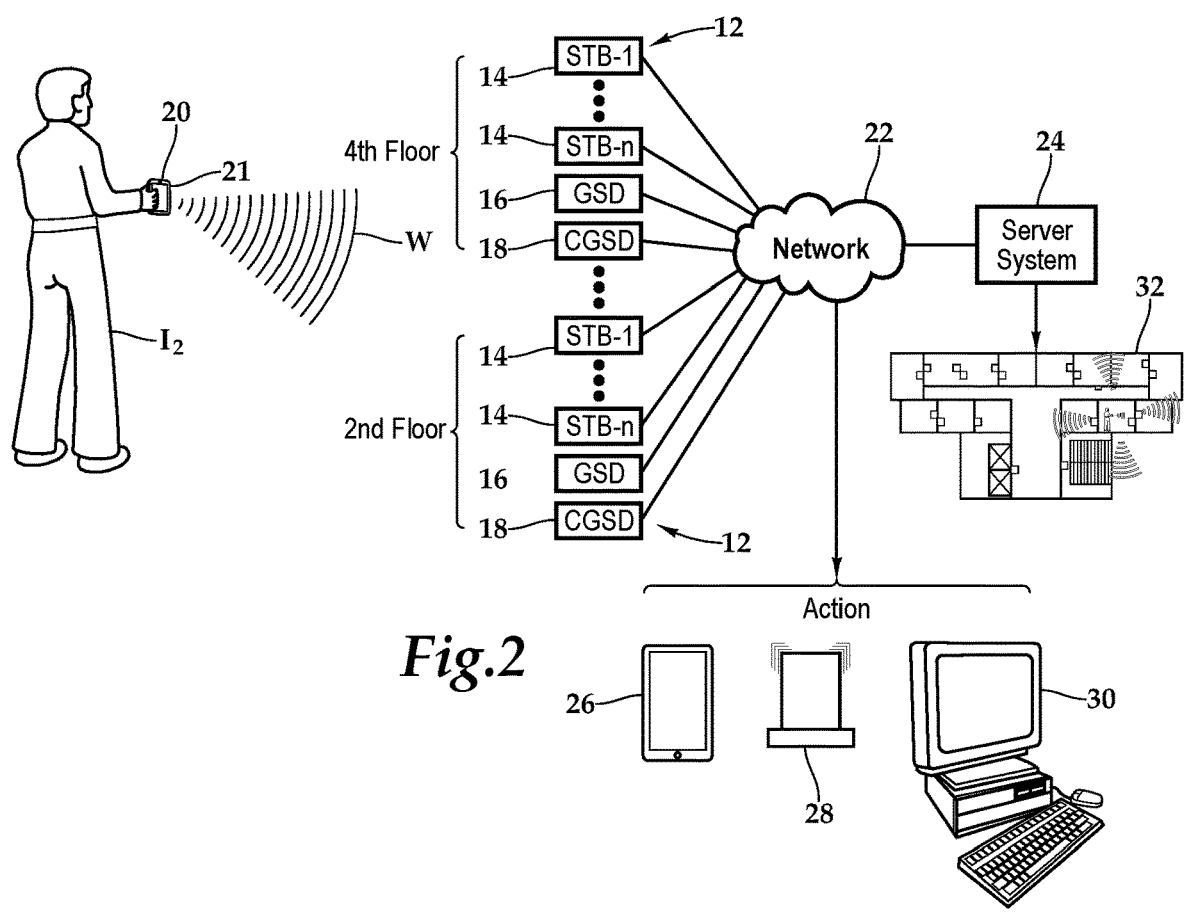
FIG. 2 is a schematic diagram depicting one embodiment of the geolocationing system presented in FIG. 1A providing enhanced awareness and safety functionality therewith according to the teachings presented herein.

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Referring initially to FIGS. 1A, 1B, 1C and 2, therein is depicted a geolocationing system for providing awareness in a multi-space environment such as a hospitality environment, which may be embodied as a furnished multi-family residence, dormitory, lodging establishment, hotel, hospital, which is schematically illustrated and designated 10. The multi-space environment may also be a multi-unit environment such as an educational environment like a school or college campus, for example. More generally, the geolocationing system 10 and the teachings presented herein are applicable to any multi-space environment including hospitality environments, educational campuses, hospital campuses, office buildings, multi-unit dwellings, sport facilities and shopping malls, for example.

As shown, by way of example and not by way of limitation, the multi-space environment is depicted as a hotel H having a lobby and floors F, which are appropriately labeled the $2^{nd}$ floor through the 10th floor. Further, by way of example, the 4th floor is depicted with rooms 401, 402, 403, 404, 405, 406, 407, 411, 412, 413, 414, 415, 416, and 417. Additionally, a common area near the elevators is labeled E, a hallway labeled B, and a stairwell is labeled S. The lobby, the common area E, the hallway B, and the stairwell S are further illustrations of spaces in the multi-space environment in addition to the rooms.

Gateway devices 12 are deployed as part of a horizontal and vertical array, which is generally a spatial array, throughout the hotel H. It should be appreciated, however, that the gateway devices 12 and more generally deployment of the system may include a horizontal array. Further, the deployment may be in a single story, multiple stories, or a combination thereof. As will be discussed in further detail hereinbelow, the gateway devices may include set-top boxes 14, a gateway service devices 16, or a common space gateway device 18.

Individuals, such as $I_1$, $I_2$, $I_3$, $I_4$ carry personal locator devices 20 which periodically, or on demand, transmit beacons that are received by a gateway device 12. The personal locator devices 20 may be a single button personal locator device or a wireless-enabled interactive programmable device, such as a smart watch, a smart phone, or a tablet computer, for example. In one embodiment, the wireless-enabled interactive programmable device 20 may be a wireless-enabled smart and interactive handheld device that may be supplied or carried by the user or guest. As shown, individual $I_2$ works in the hospitality industry at hotel H and is presently working on the $4^{th}$ floor. As the individual $I_2$ is working in room 404, the personal locator device 20 is transmitting beacons that are received by gateway devices 12, such as the set-top box 14 that is located within the room 404 and the gateway service device 16 located in hallway B on the $4^{th}$ floor of the hotel H.

As shown, the gateway device 12 in the room 404 is a set-top box 14, which may be connected to an electronic visual display device such as a display or television. The set-top box 14 may be an information appliance device that generally contains a TV-tuner as well as content input and display outputs. The set-top box 14 may be communicatively disposed with various amenities associated with the multi-space environment H as well as the system 10 providing a geolocation and safety network. The gateway device 12 in the hallway B of the $4^{th}$ floor is a gateway service device 16 and a common space gateway device is also in the hallway of the $4^{th}$ floor. The gateway service device 16 may be communicatively disposed with various amenities associated with the multi-space environment H as well as the system 10 providing the geolocation and safety network. The common space gateway device 18 may include a limited set of functionality as compared to the gateway service device 16. The limited functionality, however, includes connectivity to the system 10 providing the geolocation and safety network. Gateway devices, like the gateway device 12, including the set-top box 14, the gateway service device 16, and the common space gateway device 18 may be deployed throughout the spaces S, rooms, and other areas of the hotel H or multi-space environment.

As mentioned, each of the gateway devices 12, including the set-top boxes 14, the gateway service devices 16, and the common space gateway devices 18, have a data link via a network 22 to a server system 24 which is providing a geolocation and safety network with a redundant architecture. In one implementation, an individual $I_2$ has the personal locator device 20, which includes a housing 21 and may transmit a beacon from the personal locator device 20 using a wireless standard such as WiFi to the gateway devices 12. Each of the gateway devices 12, including the set-top box 14 and the gateway service device 16, then processes the received beacon signal and sends a gateway signal to the server system 24. The server system 24 receives the gateway signals and uses multiple gateway signals for determining the estimated location of the personal locator device 20 of the individual $I_2$. The server system 24, in turn, sends out the appropriate notifications to various phones 26, activates alarms 28, or notify others via a computer 30, depending on the situation. As a spatial array of horizontal and vertical gateway devices 12 are provided, the server system 24 and system 10 presented herein is able to determine the location of the individual associated with the personal locator device 20 within a building. As particularly illustrated in FIGS. 1C and 2, the individual $I_2$ is in need of emergency assistance and activates the personal locator device 20. In one implementation, beacon signals are received by all nearby gateway devices 12, which in turn forward gateway signals to the server system 24 for processing and determining the estimated location. The estimated location includes which floor F the individual is presently located as well as the room or common area and the presence of a status or an alarm, such as Alarm A. In one embodiment, this information may be generated by the server system 24 in the form of a map view 32, which includes a graphical representation of the multi-space environment that is annotated with the estimated location of the proximate wireless-enabled personal locator device.

Figure 3A:
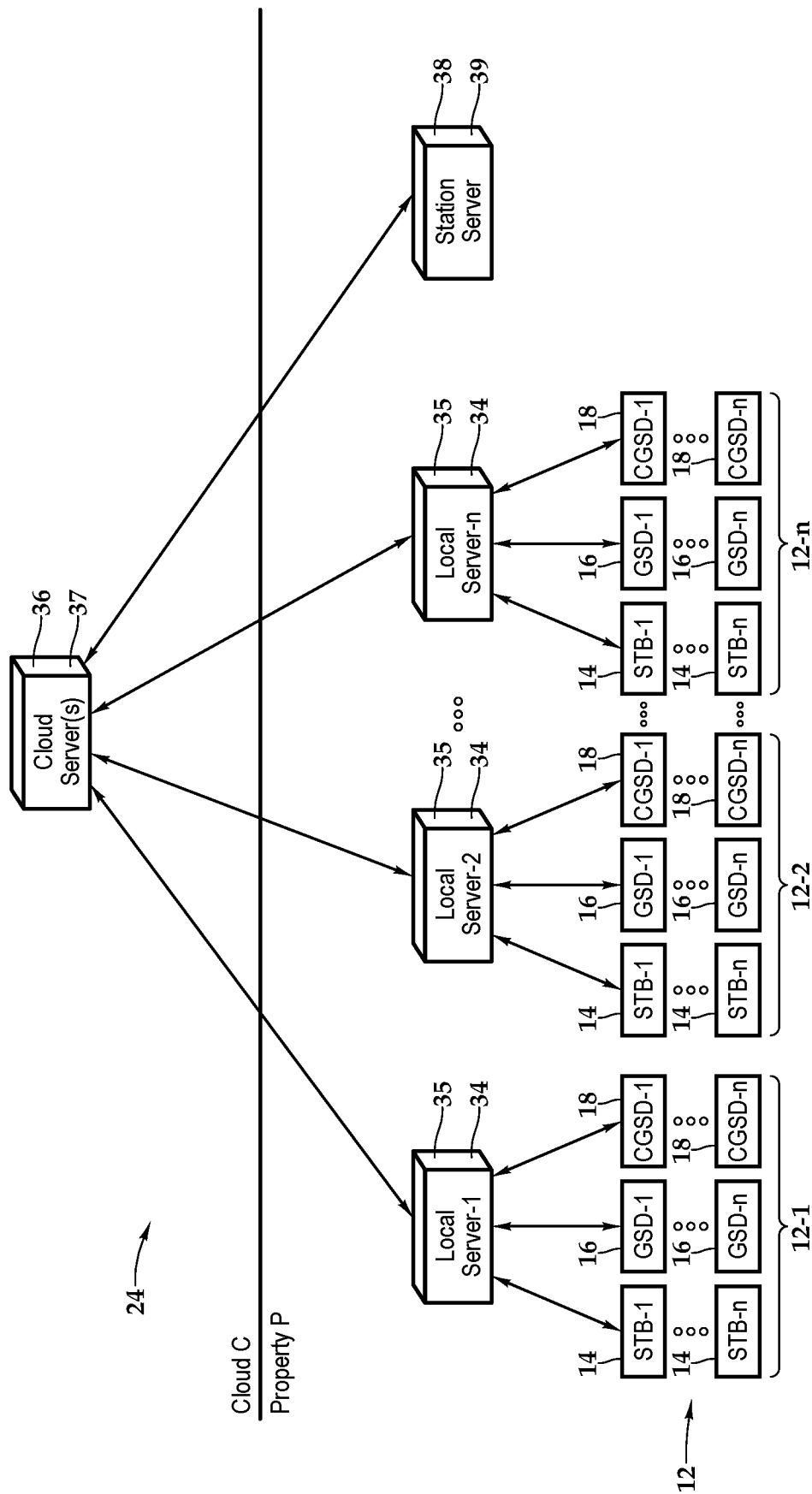
FIG. 3A is a functional block diagram depicting one embodiment of the geolocationing system presented in FIG. 1A providing a redundant server system architecture according to the teachings presented herein.

Referring to FIG. 3A, one embodiment of the redundant architecture of the server system 24 is illustrated. As shown, the gateway devices 12 are disposed in communication with the server system 24. For purposes of explanation and not by way of limitation, the gateway devices 12 include three groupings of gateway devices 12-1, 12-2, . . . , 12-n. Within each group of gateway devices, set-top boxes 14, gateway service devices 16, and common area gateway service devices 18 are located. The server system includes property P and cloud C. Local servers 34, including local server-1, local server-2, . . . , local server-n, are disposed within the property P layer. Each of the local servers 34 has a housing 35. A cloud server or cloud servers 36 is located within the cloud C layer. Each of the cloud servers 36 includes a housing 37. A server station 38 is located within the property P layer. The server station 38 includes a housing 39. In one embodiment, the station server may be on-property management server for management of the server system 24. Management may include, but is not limited to status inquires, uptime inquires, and monitoring for any new or recurring issues as well as notifications and alerts sent out by the server system 24.

In one embodiment, the server system 24 consists of multiple components performing respective functions to provide notification, alerting, and locationing capabilities. Redundancies may be provided at each level to ensure no single point failure or single point failures. By way of example, redundancies may be provided within the property P level and the cloud C level to ensure functionality.

Figure 3B:
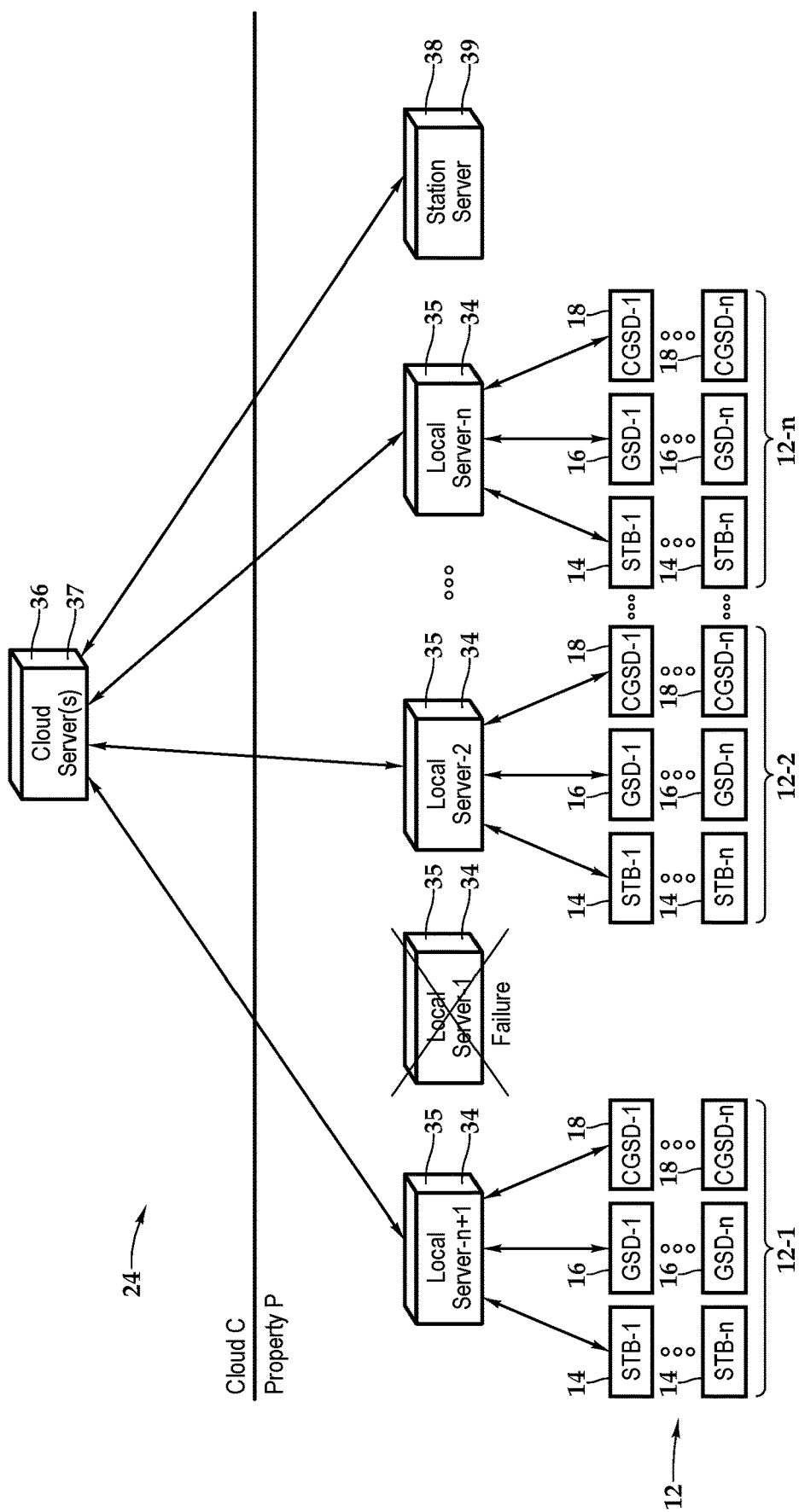
FIG. 3B is a functional block diagram depicting one embodiment of the redundant server system architecture presented in FIG. 3A in a first mode of redundant operations.

Referring to FIG. 3B, in one embodiment, redundancy is provided to the local servers 34 located at the property P. As shown, the local server-1 has failed. As shown, a secondary server, local server-n+1, is brought online to replace the failed local server-1. A failsafe mechanism is provided between the primary server, local server-1, and the secondary server, local server-n+1, so that the secondary server, local server-n+1, can take over the functions of the primary server, local server-1, if the primary server, local server-1, goes down. It should be appreciated that more than one secondary server may be employed by the server system 24. It should also be appreciated that a secondary server may be assigned to more than one primary server.

Figure 3C:
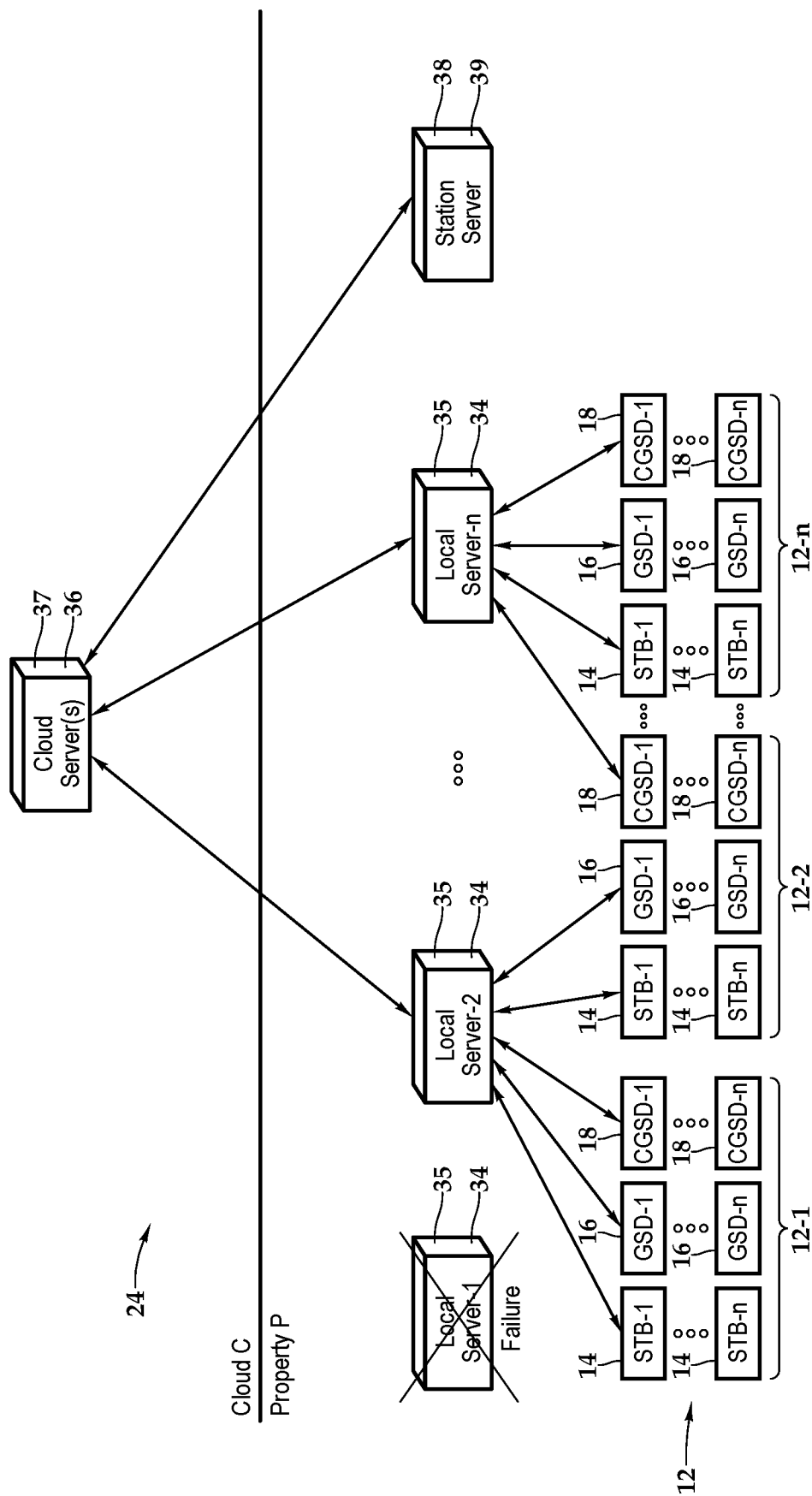
FIG. 3C is a functional block diagram depicting one embodiment of the redundant server system architecture presented in FIG. 3A in a second mode of redundant operations.

Referring to FIG. 3C, in another embodiment, redundancy is provided to the local servers 34 located at the property P. As shown, the local server-1 has failed. The server system 24 utilizes load sharing to provide local server redundancy. The local servers 34 share the load so that when one local server, such as local server-1, fails, the other local servers, local server-2 . . . local server-n, take on the load. As depicted, following the failure of local server-1, local server-2 . . . local server-n share the load. More particularly, the gateway device grouping 12-1 and a portion of the gateway device grouping 12-2 are engaged with the local server-2 while a portion of the gateway device grouping 12-2 and the gateway device grouping 12-n are engaged with the local server-n.

Figure 3D:
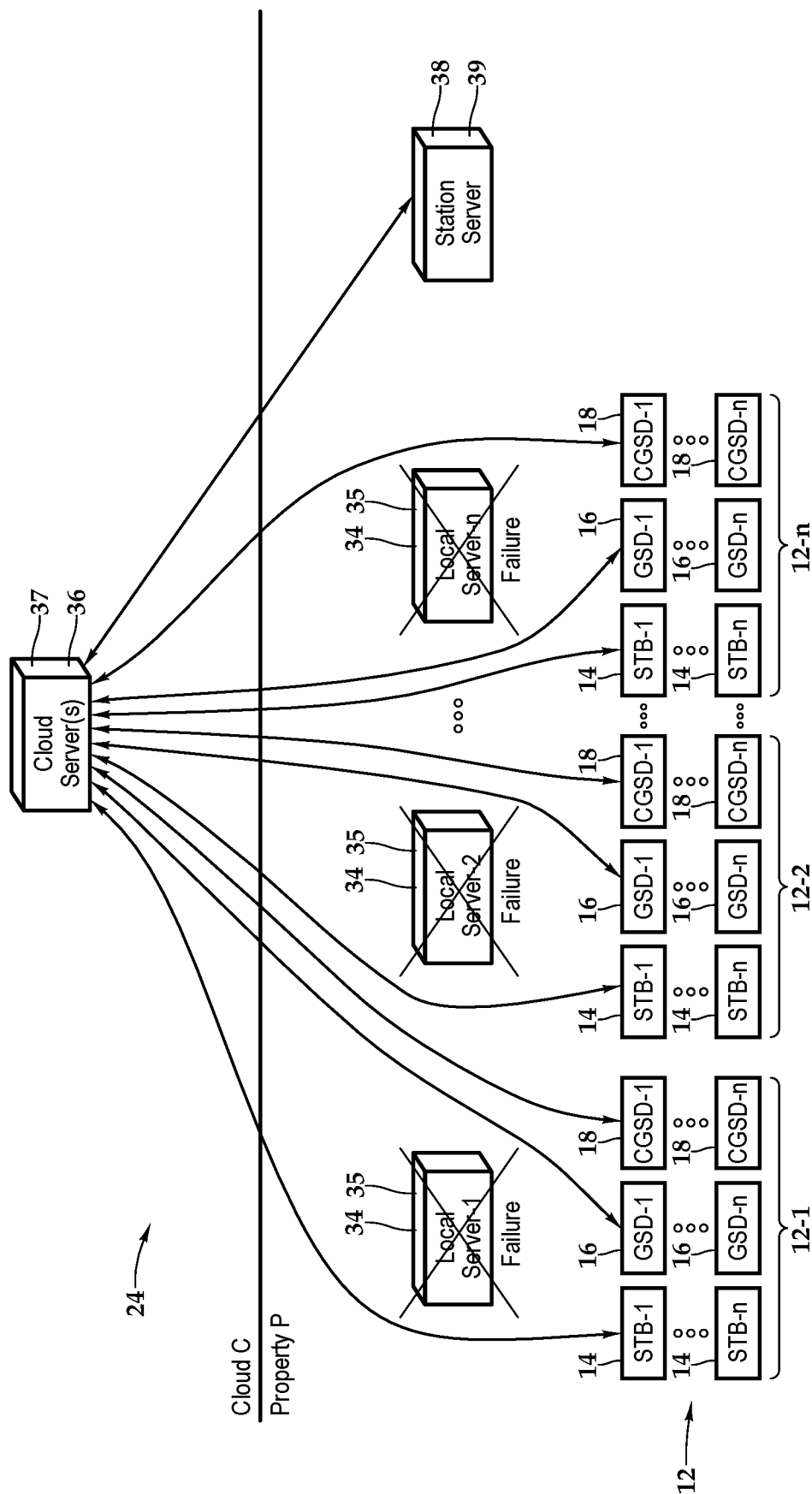
FIG. 3D is a functional block diagram depicting one embodiment of the redundant server system architecture presented in FIG. 3A in a third mode of redundant operations.

Referring to FIG. 3D, in still another embodiment, redundancy is provided to the local servers 34 located at the property P. As shown, all the local servers 34, including the local server-1 . . . local server-n, have failed. In the illustrated implementation, the gateway devices 12 typically report to the local servers 34. The local servers 34 collect data from the gateway devices 12 and forward the collected data to the cloud server 36 for processing and any additional required calculation. Having the gateway devices 12 proxy communications through the local servers 34 significantly reduces the number of network connections made to the cloud server 36, while providing an efficient method of communicating to the cloud server 36. In the illustrated case of a degraded server system 24 where the local servers 34 are offline, each of the gateway devices 12 can switch to a direct connection mode to the cloud server 36 temporarily until the failure is cured. In this implementation of redundancy, the cloud server 36 will recognize that the local servers 34 are down and begin to receive the individual gateway device 12 connections and handle the data based on the direct data from each of the gateway devices 12 on the property P. The server system 24 may return to normal (See FIG. 3A, for example) when the local servers 34 are restored. It should be appreciated that in some embodiments, a cloud server 26 may server hundreds of properties; therefore, the number of simultaneous connections to the property P can be managed by the teachings presented herein to allow the head room to handle the possible direct gateway device connections from a degraded server system at a property.

Figure 3E:
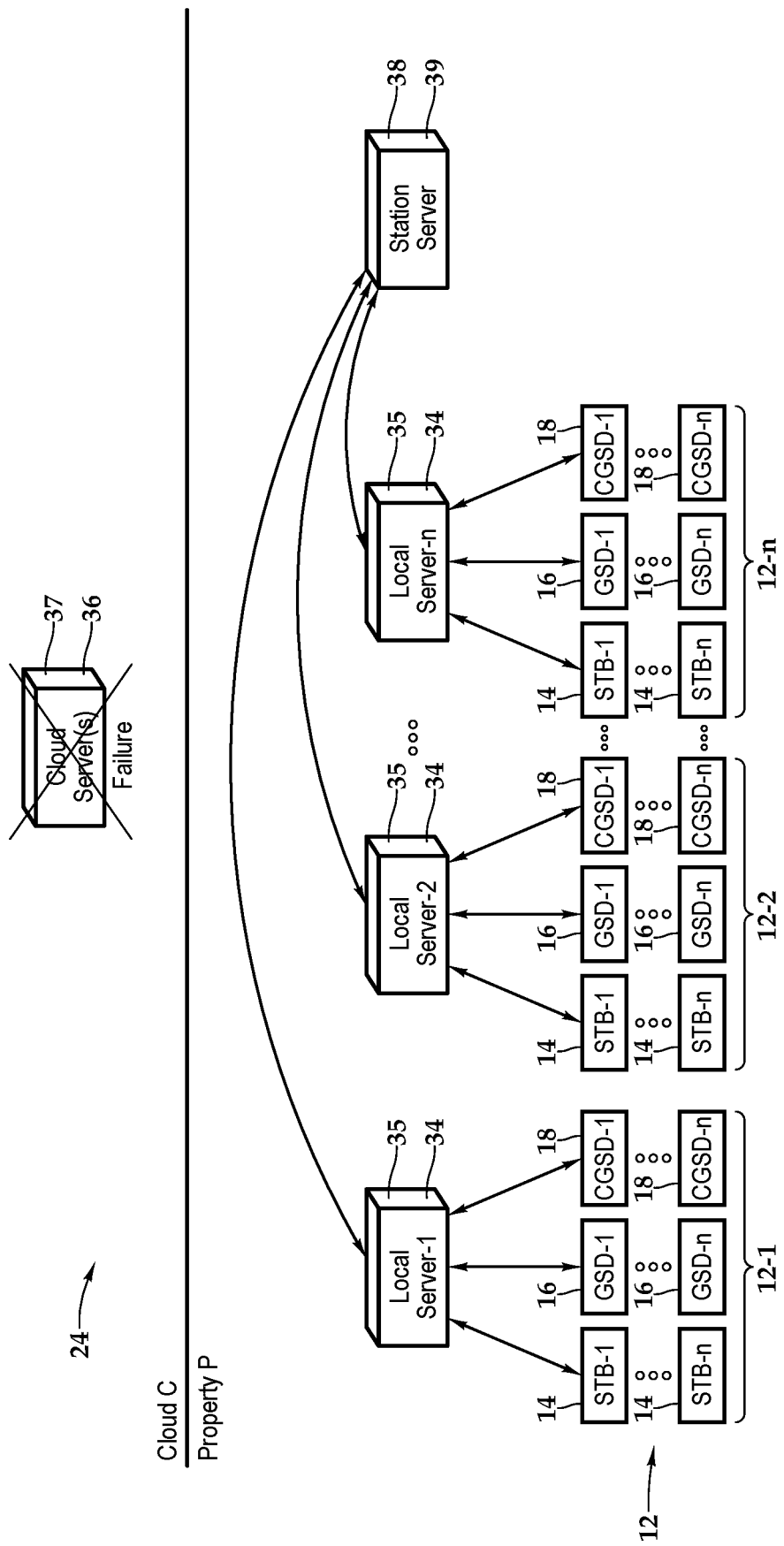
FIG. 3E is a functional block diagram depicting one embodiment of the redundant server system architecture presented in FIG. 3A in a fourth mode of redundant operations.

Referring to FIG. 3E, in a still further embodiment, redundancy is provided to the cloud server 36 located at the cloud C. As shown, the cloud server 36 has failed as a result of being down or being unreachable, for example. In the illustrated implementation, the server system 24 maintains operations by mirror the cloud functionality on the local servers 34, local server-1 . . . local server-n. The local servers 34 may be operating as a conduit to the cloud server 36, providing data reported from the gateway devices 12. To provide the backup function for the cloud C layer, the local servers 34 run the cloud services locally at the property P layer. The notifications and alerts, which may be distributed by email or text messages, may not be distributed normally. These notifications and alerts, however, are reported to the server station 38 at the property P.

Figure 4:
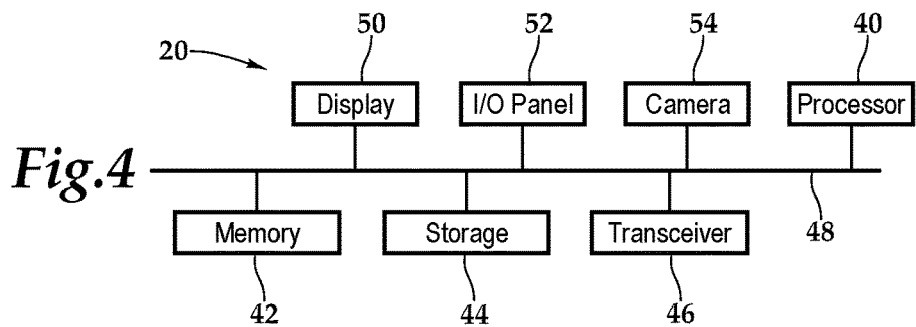
FIG. 4 is a functional block diagram depicting one embodiment of a personal locator device depicted in FIG. 2 in further detail.

Referring to FIG. 4, the programmable device 20 may be a wireless communication device of the type including various fixed, mobile, and/or portable devices. To expand rather the limit the previous discussion of the programmable device 20, such devices may include, but are not limited to, cellular or mobile telephones, two-way radios, personal digital assistants, digital music players, Global Position System units, tablet computers, smartwatches, smartwatches, smart pendants, and so forth. The programmable device 20 may include, within the housing 21, a processor 40, memory 42, storage 44, and a transceiver 46 interconnected by a busing architecture 48 that also supports a display 50, I/O panel 52, and a camera 54. It should be appreciated that although a particular architecture is explained, other designs and layouts are within the teachings presented herein.

In operation, the teachings presented herein permit a programmable device 20 such as a smart phone or simple transmitter to communicate with one or more of the gateway devices 12 that is able to relay an alert with location information to the server system 24 and security or other individuals needing to know about the emergency. In one operational embodiment being described, the programmable device 20 may transmit beacon signals deliberatively or on a periodic basis to the gateway devices 12. As shown, the programmable device 20 includes the memory 42 accessible to the processor 40 and the memory includes processor-executable instructions that, when executed, cause the processor to send beacon signals. The programmable device 20 may on-demand or periodically transmit the beacon signal including a data packet the programmable device identification as well as a mode of operation identification.

Figure 5:
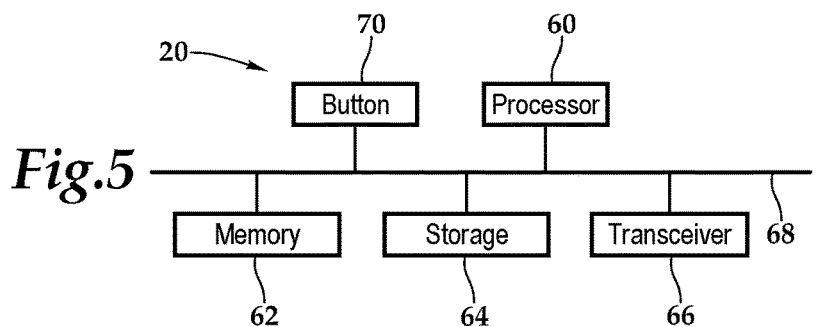
FIG. 5 is a functional block diagram depicting another embodiment of a personal locator device depicted in FIG. 2 in further detail.

Referring to FIG. 5, with respect to a simplified version of the programmable device 20, within housing 21, a processor 60, memory 62, storage 64, and a transceiver 66 are supported by an interconnected busing architecture 68. A button 70 provides the activation that triggers the alert. As shown, the programmable device 20 includes the memory 62 accessible to the processor 60 and the memory 62 includes processor-executable instructions that, when executed, cause the processor to send beacon signals. The programmable device 20 may on-demand or periodically transmit the beacon signal including a data packet having the programmable device identification as well as a mode of operation identification. In one embodiment, responsive to the activation of the emergency button, the programmable device 20 immediately transmits a beacon signal, including a data packet having the programmable device identification, as well as a mode of operation identification, i.e., an emergency alert.

Figure 6:
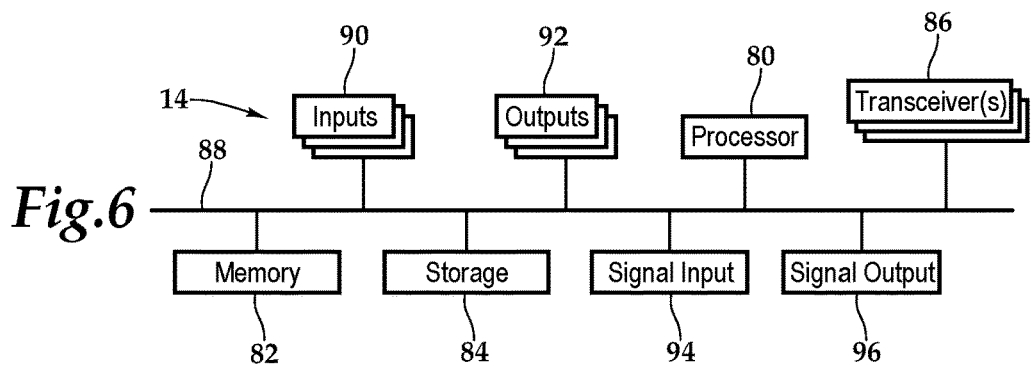
FIG. 6 is a functional block diagram depicting one embodiment of a gateway device, a set-top box, presented in FIG. 1A.

Referring to FIG. 6, as used herein, set-top boxes, back boxes and set-top/back boxes may be discussed as set-top boxes. By way of example, the set-top box 14 may be a set-top unit that is an information appliance device that generally contains set-top box functionality including having a television-tuner input and displays output through a connection to a display or television set and an external source of signal, turning by way of tuning the source signal into content in a form that can then be displayed on the television screen or other display device. Such set-top boxes are used in cable television, satellite television, and over-the-air television systems, for example.

The set-top box 14 includes a processor 80, memory 82, storage 84, and one or more transceivers 86 interconnected by a bus architecture 88 within a mounting architecture that supports inputs 90 and outputs 92. It should be understood that the processor 80, the memory 82, the storage 84, the inputs 90, and the outputs 92 may be entirely contained within the housing or the housing-dongle combination. The processor 80 may process instructions for execution within the computing device, including instructions stored in the memory 82 or in storage 84. The memory 82 stores information within the computing device. In one implementation, the memory 82 is a volatile memory unit or units. In another implementation, the memory 82 is a non-volatile memory unit or units. Storage 84 provides capacity that is capable of providing mass storage for the set-top box 14. Various inputs 90 and outputs 92 provide connections to and from the computing device, wherein the inputs 90 are the signals or data received by the set-top box 14, and the outputs 92 are the signals or data sent from the set-top box 14. A television content signal input and a television signal output 96 are also secured in the housing in order to receive content from a source and forward the content, including external content such as cable and satellite and pay-per-view (PPV) programming, to the display.

The one or more transceivers 86 are associated with the set-top box 14 and communicatively disposed with the bus 88. As shown the transceiver 86 may be internal, external, or a combination thereof to the housing. Further, the transceiver 86 may be a transmitter/receiver, receiver, or an antenna for example. Communication between various devices and the set-top box 14 may be enabled by a variety of wireless methodologies employed by the transceiver 86, including 802.11, 3G, 4G, Edge, WiFi, ZigBee, near field communications (NFC), Bluetooth low energy and Bluetooth, for example. Also, infrared (IR) may be utilized.

The memory 82 and storage 84 are accessible to the processor 80 and include processor-executable instructions that, when executed, cause the processor 80 to execute a series of operations. With respect to the processor-executable instructions, the processor 80 is caused to receive and process a beacon signal including a personal locator device identification. More particularly, the processor-executable instructions cause the processor 80 to receive a beacon signal via the wireless transceiver from a proximate wireless-enabled personal locator device. The processor-executable instructions then cause the processor 80 to measure received signal characteristic of the beacon signal. The instructions may then cause the processor 80 to generate a gateway signal including the personal locator device identification, a gateway device identification, and signal characteristics indicator, including received signal characteristic. Finally, the instructions may cause the processor 96 to send the gateway signal to the server system 24.

Figure 7:
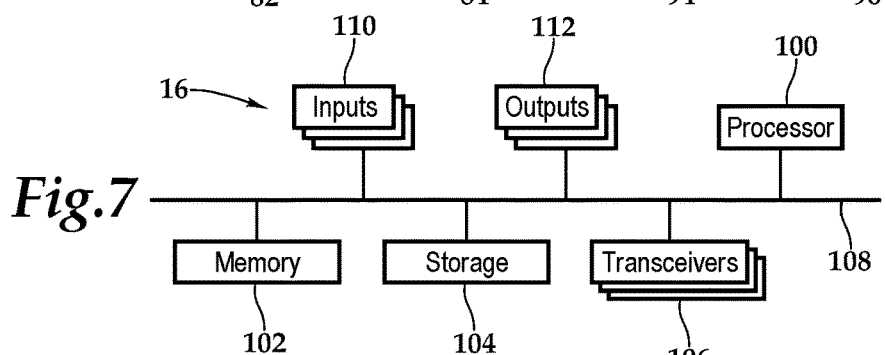
FIG. 7 is a functional block diagram depicting one embodiment of a gateway device, a gateway service devices, presented in FIG. 1A.

Referring to FIG. 7, the gateway device 12 may be a set-top unit that is an information appliance device that does not include television-tuner functionality and generally contains convenience and safety functionality. The gateway service device 16 includes a processor 100, memory 102, storage 104, and transceivers 106 interconnected by a bus architecture 108 within a mounting architecture that supports inputs 110 and outputs 112. The processor 100 may process instructions for execution within the computing device, including instructions stored in the memory 102 or in storage 104. The memory 102 stores information within the computing device. In one implementation, the memory 102 is a volatile memory unit or units. In another implementation, the memory 102 is a non-volatile memory unit or units. Storage 104 provides capacity that is capable of providing mass storage for the gateway device 12. Various inputs 110 and outputs 112 provide connections to and from the computing device, wherein the inputs 110 are the signals or data received by the gateway device 12, and the outputs 112 are the signals or data sent from the gateway device 12.

One or more transceivers 106 may be associated with the gateway device 12 and communicatively disposed with the bus 108. The transceivers 106 may be internal, external, or a combination thereof to the housing. Further, the transceivers 106 may be a transmitter/receiver, receiver, or an antenna for example. Communication between various amenities in the hotel room and the gateway device 12 may be enabled by a variety of wireless methodologies employed by the transceivers 106, including 802.11, 802.15, 802.15.4, 3G, 4G, Edge, Wi-Fi, ZigBee, near field communications (NFC), Bluetooth low energy and Bluetooth, for example. Also, infrared (IR) may be utilized.

The memory 102 and storage 104 are accessible to the processor 100 and include processor-executable instructions that, when executed, cause the processor 100 to execute a series of operations. With respect to the processor-executable instructions, the processor 100 is caused to receive and process a beacon signal including a personal locator device identification. More particularly, the processor-executable instructions cause the processor 100 to receive a beacon signal via the wireless transceiver from a proximate wireless-enabled personal locator device 20. The processor-executable instructions then cause the processor 100 to measure a received signal characteristic of the beacon signal. The instructions may then cause the processor 100 to generate a gateway signal including the personal locator device identification, a gateway device identification, and signal characteristics indicator. Finally, the instructions may cause the processor 100 to send the gateway signal to the server system 24.

Figure 8:
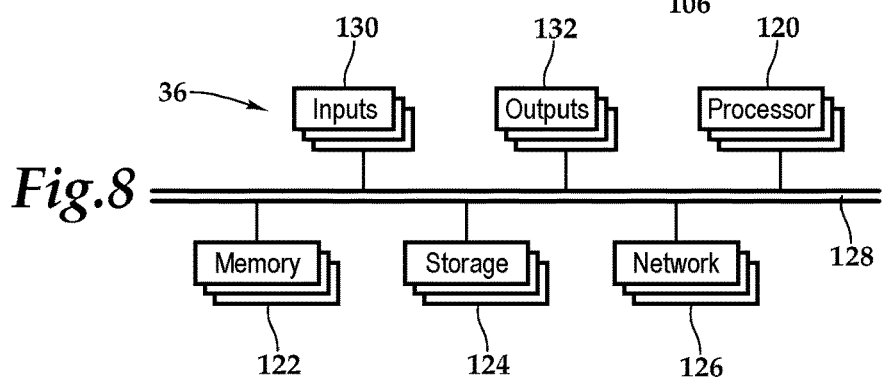
FIG. 8 is a functional block diagram depicting one embodiment of a cloud server, an element of a server system presented in FIG. 2.

Referring now to FIG. 8, one embodiment of the cloud server 36 as a computing device includes, within the housing 37, a processor 120, memory 122, storage 124, and one or more network adapters 126 interconnected with various buses 128 in a common or distributed, for example, mounting architecture, that supports inputs 130 and outputs 132. In other implementations, in the computing device, multiple processors and/or multiple buses may be used, as appropriate, along with multiple memories and types of memory. Further still, in other implementations, multiple computing devices may be provided and operations distributed therebetween. The processor 120 may process instructions for execution within the cloud server 36, including instructions stored in the memory 122 or in storage 124. The memory 122 stores information within the computing device. In one implementation, the memory 122 is a volatile memory unit or units. In another implementation, the memory 122 is a non-volatile memory unit or units. Storage 124 includes capacity that is capable of providing mass storage for the server system 24. The various inputs 130 and outputs 132 provide connections to and from the cloud server 36, wherein the inputs 130 are the signals or data received by the server system 24, and the outputs 132 are the signals or data sent from the cloud server 36. The network adaptor 126 couples the cloud server 36 to a network such that the cloud server 36 may be part of a network of computers, a local area network (LAN), a wide area network (WAN), an intranet, a network of networks, or the Internet, for example.

The memory 122 and storage 124 are accessible to the processor 120 and include processor-executable instructions that, when executed, cause the processor 120 to execute a series of operations. In one embodiment of processor-executable instructions, the processor-executable instructions cause the processor to receive a plurality of gateway signals from a plurality of gateway devices of the vertical and horizontal array. The processor 120 is caused to process the plurality of gateway signals and determine estimated location of the proximate wireless-enabled personal locator device 20. The processor may 120 also be caused to annotate the graphical representation of the multi-space environment with location of the proximate wireless-enabled personal locator device 20 and annotate the graphical representation of the room with the alert notification.

Figure 9:
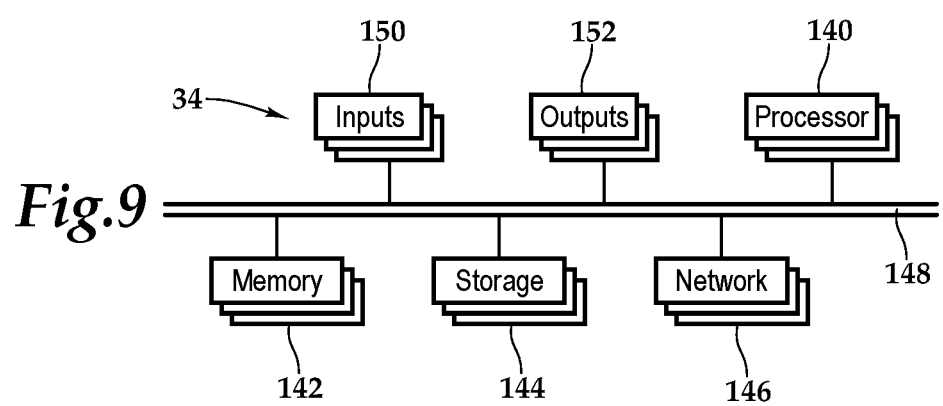
FIG. 9 is a functional block diagram depicting one embodiment of a local server, an element of a server system presented in FIG. 2.

FIG. 9 depicts one embodiment of the local server 34 as a computing device includes, within the housing 35, a processor 140, memory 142, storage 144, and one or more network adapters 146 interconnected with various buses 148 in a common or distributed, for example, mounting architecture, that supports inputs 150 and outputs 152. In other implementations, in the computing device, multiple processors and/or multiple buses may be used, as appropriate, along with multiple memories and types of memory. Further still, in other implementations, multiple computing devices may be provided and operations distributed therebetween. The processor 140 may process instructions for execution within the local server 34, including instructions stored in the memory 142 or in storage 144. The memory 142 stores information within the computing device. In one implementation, the memory 142 is a volatile memory unit or units. In another implementation, the memory 142 is a non-volatile memory unit or units. Storage 144 includes capacity that is capable of providing mass storage for the local server 34. The various inputs 150 and outputs 152 provide connections to and from the local server 34, wherein the inputs 150 are the signals or data received by the local server 34, and the outputs 152 are the signals or data sent from the local server 34. The network adaptor 146 couples the cloud server 36 to a network such that the cloud server 36 may be part of a network of computers, a local area network (LAN), a wide area network (WAN), an intranet, a network of networks, or the Internet, for example.

The memory 142 and storage 144 are accessible to the processor 140 and include processor-executable instructions that, when executed, cause the processor 140 to execute a series of operations. In one embodiment of first processor-executable instructions, the processor-executable instructions cause the processor 140 to receive a plurality of gateway signals from a plurality of gateway devices of the vertical and horizontal array. The processor 140 is caused to process the plurality of gateway signals and determine estimated location of the proximate wireless-enabled personal locator device 20. The processor 140 may also be caused to annotate the graphical representation of the multi-space environment with location of the proximate wireless-enabled personal locator device and annotate the graphical representation of the room with the alert notification. In one embodiment of second processor-executable instructions, the processor-executable instructions cause the processor 140 to receive a plurality of gateway signals from a plurality of gateway devices of the vertical and horizontal array. The processor 140 is caused to forward the received gateway signals to the cloud server 36.

Figure 10:
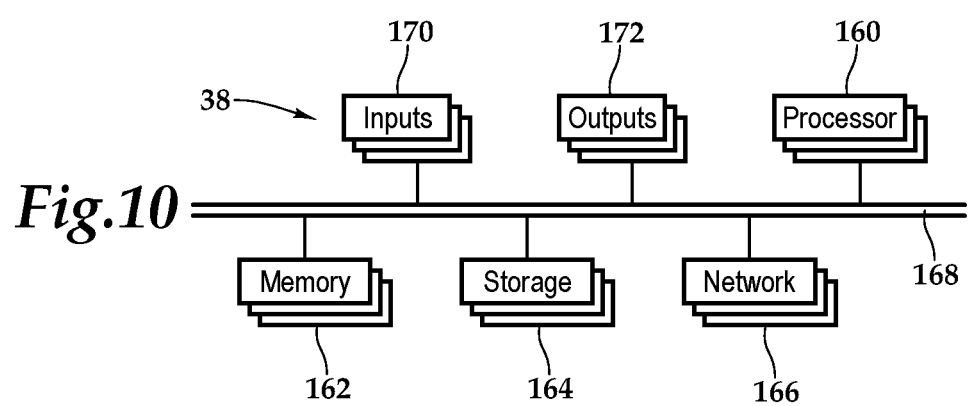
FIG. 10 is a functional block diagram depicting one embodiment of a station server, an element of a server system presented in FIG. 2.

FIG. 10 depicts one embodiment of the server station 38 as a computing device includes, within the housing 39, a processor 160, memory 162, storage 164, and one or more network adapters 166 interconnected with various buses 168 in a common or distributed, for example, mounting architecture, that supports inputs 170 and outputs 172. In other implementations, in the computing device, multiple processors and/or multiple buses may be used, as appropriate, along with multiple memories and types of memory. Further still, in other implementations, multiple computing devices may be provided and operations distributed therebetween. The processor 160 may process instructions for execution within the server station 38, including instructions stored in the memory 162 or in storage 164. The memory 162 stores information within the computing device. In one implementation, the memory 162 is a volatile memory unit or units. In another implementation, the memory 162 is a non-volatile memory unit or units. Storage 164 includes capacity that is capable of providing mass storage for the server station 38. The various inputs 170 and outputs 172 provide connections to and from the server station 38, wherein the inputs 170 are the signals or data received by the server station 38, and the outputs 172 are the signals or data sent from the server station 38. The network adaptor 166 couples the server station 38 to a network such that the server station 38 may be part of a network of computers, a local area network (LAN), a wide area network (WAN), an intranet, a network of networks, or the Internet, for example.

The memory 162 and storage 164 are accessible to the processor 160 and include processor-executable instructions that, when executed, cause the processor 160 to execute a series of operations. In one embodiment of first processor-executable instructions, the processor-executable instructions cause the processor 160 to receive a plurality of gateway signals from a plurality of gateway devices of the vertical and horizontal array. The processor 160 is caused to process the plurality of gateway signals and determine estimated location of the proximate wireless-enabled personal locator device 20. The processor 160 may also be caused to annotate the graphical representation of the multi-space environment with location of the proximate wireless-enabled personal locator device and annotate the graphical representation of the room with the alert notification. In one embodiment of second processor-executable instructions, the processor-executable instructions cause the processor 160 to receive a plurality of gateway signals from a plurality of gateway devices of the vertical and horizontal array. The processor 160 is caused to forward the received gateway signals to the cloud server 36. In one embodiment of third processor-executable instructions, the processor-executable instructions cause the processor to receive locationing information, including notifications and alerts, from the local servers 34. The processor 160 is caused to then transmit appropriate notifications and alerts. In one embodiment of fourth processor-executable instructions, the processor-executable instructions cause the processor 160 to receive locationing information, including notifications and alerts, from the cloud server 36. The processor 160 is caused to then transmit appropriate notifications and alerts.

Figure 11:
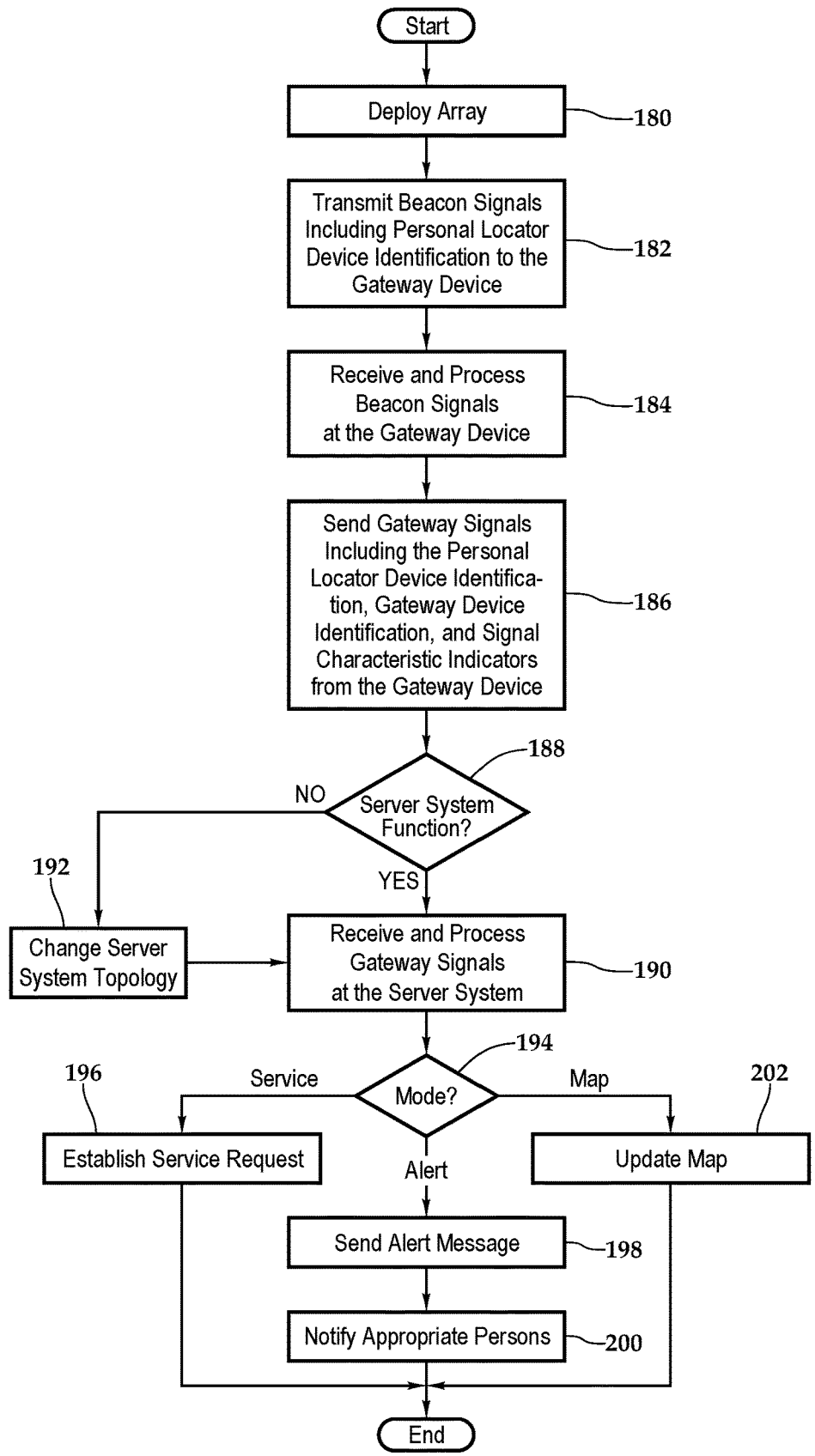
FIG. 11 is a flow chart depicting one embodiment of a method for providing a gateway device furnishing enhanced safety according to the teachings presented herein.

FIG. 11 depicts one embodiment of a method for providing safety in a hospitality environment or other environment, according to the teachings presented herein. At block 180, the array of gateway devices is deployed vertically and horizontally or horizontally throughout the multi-space environment, such as a hospitality environment or an educational environment. At block 182, beacon signals are periodically transmitted from personal locator devices and received by the gateway devices.

At block 184, the beacon signals are received and processed at the gateway device. The beacon signals may include a personal locator device identification corresponding to the device being employed by the user. In one embodiment, a signal characteristic, such as received signal strength is measured. In other embodiments, phase angle measurements or flight time measurements may be utilized. At block 186, gateway signals are sent from the gateway devices to a server system that is part of the geolocation and safety network. The gateway signals may include the personal locator device identification, gateway device identification, and signal characteristic indicators. At decision block 188, if the server system is functionally normally then the process advances to block 190. If, on the other hand, the server system is not functioning normally and has one or more failures, for example, then the methodology advances to block 192 before the methodology continues to block 190. At block 192, the topology of the server system changes to address the failure. One embodiment of this methodology is examined below in more detail in FIG. 12.

At block 190, the server system receives and processes the gateway signals to determine an estimated location. At decision block 194, the server system takes action based on the mode of operation. In a first mode of operation at block 196, a service request is associated with the location of the user utilizing the location of the personal locator device such as the wireless-enabled interactive programmable device as a proxy. In a second mode of operation at block 198, an emergency alert is sent and subsequent notification (block 200) occurs. The emergency alert includes an indication of distress and the location of the user utilizing the location of the wireless-enabled interactive programmable device as a proxy. In a third mode of operation at block 202, the map of individuals is updated with the location of the user with, if privacy settings being enabled, the system maintains the privacy of the individual working in the hospitality environment such that the system only retains in memory the last known position and time of the user-supplied wireless-enabled smart and interactive handheld device. Further, in this mode of operation, the system does not reveal the location of the individual and programmable device unless and until an alert is issued.

Figure 12:
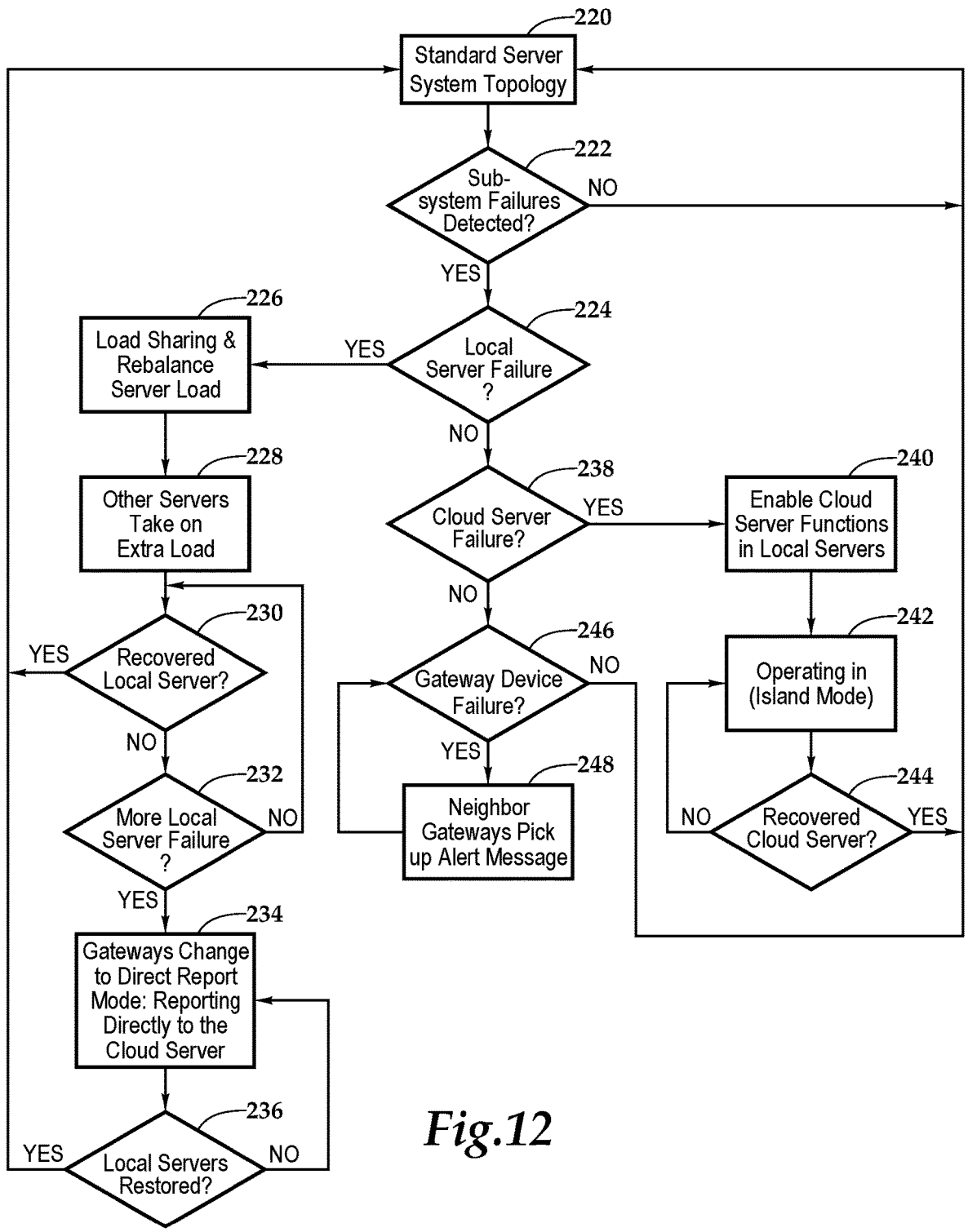
FIG. 12 is a flow chart depicting one embodiment of a method for providing enhanced safety with redundant architecture according to the teachings presented herein.

FIG. 12 depicts one embodiment of a method for providing redundancy in a system for furnishing safety in a hospitality environment or other environment, according to the teachings presented herein. At block 220, the server system initially operates with a standard server system topology. At decision block 222, if a subsystem failure is detected at the property P level or the cloud C level, for example, then the methodology advances to decision block 224. If, on the other hand, no subsystem failure is detected then the methodology returns to block 220. At decision block 224, if a failure is detected with the local servers then the methodology advances to blocks 226 and 228, where load sharing and rebalancing of the local server load is executed by local servers not experiencing the failure taking on the additional load. At decision block 230, if the local servers impacted by the failure have recovered, then the process returns to block 220. If the local server or servers impacted by the failure have not recovered then the methodology advances to decision block 232. At decision block 232, if more local servers fail then the process advances to block 234. As shown, if no additional local servers are failing then the process returns to decision block 230. At block 234, if local server failure continues, then the gateway devices operate in a direct report mode where the gateway devices report directly to the cloud server. At decision block 236, as illustrated, the reporting directly to the cloud server continues until the local servers are restored.

Returning to decision block 224, if no local server failures are detected then the process advances to decision block 238, where if a failure of the cloud server or cloud servers is detected then the process advances to blocks 240, 242 where the cloud server functions are enabled in the local servers and an island mode is initiated where the functionality of the station server is employed to assist with locationing and notifications, including alerts. As shown by decision block 244, this continues until the cloud servers are recovered. At which time, the methodology returns to block 220 where standard server system topology is employed. Returning to decision block 238, if no cloud server failure is detected then the methodology advances to decision block 246 where gateway device failure is examined. If no gateway device failure is detected, then the methodology returns to block 220. On the other hand, if a gateway device failure is detected, then at block 248, neighboring gateway devices to the failing gateway device handle the data and messaging responsibilities until, as shown, the gateway failure is resolved.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for providing awareness in a multi-space environment, the system comprising:
   a vertical and horizontal array of gateway devices, each gateway device being positioned within a space in the multi-space environment, each gateway device having a gateway device identification providing an accurately-known fixed location;
   each gateway device of the vertical and horizontal array including:
   a housing,
   a wireless transceiver associated with the housing,
   a processor located within the housing and coupled to the wireless transceiver,
   a memory accessible to the processor, the memory including processor-executable instructions that, when executed, cause the processor to:

receive a beacon signal via the wireless transceiver from a proximate wireless-enabled personal locator device, the beacon signal including a personal locator device identification, measure a signal characteristic of the beacon signal, transmit a gateway signal to a server system, the gateway signal including the personal locator device identification, the gateway device identification, and received signal strength measurement;

the server system located in communication with the vertical and horizontal array of gateway devices, the server system processing the plurality of gateway signals to determine an estimated location of the proximate wireless-enabled personal locator device;

the server system including at least one local server co-located in communication with the vertical and horizontal array of gateway devices at the multi-space environment;

the server system including at least one cloud server remotely located in communication with the at least one local server; and the at least one local server of the server system processes the plurality of gateway signals to determine an estimated location of the proximate wireless-enabled personal locator device, in response to a failure of the at least one cloud server.

2. The system as recited in claim 1, wherein the server system further comprises redundancy at each of the at least one local server and the cloud server in response to a failure.

3. The system as recited in claim 1, wherein the at least one local server co-located in communication with the vertical and horizontal array of gateway devices further comprises at least one primary server and at least one secondary server, the secondary server taking over for the primary server in response to a failure of the primary server.

4. The system as recited in claim 1, wherein the at least one local server co-located in communication with the vertical and horizontal array of gateway devices further comprises a plurality of local servers, the plurality of local servers sharing load and rebalancing the load in response to a failure of one of the plurality of local servers.

5. The system as recited in claim 1, wherein the vertical and horizontal array of gateway devices proxy communications through the at least one local server to the at least one cloud server.

6. The system as recited in claim 1, wherein the vertical and horizontal array of gateway devices proxy communications through the at least one local server to the at least one cloud server, the vertical and horizontal array of gateway devices proxying communications directly to the at least one cloud server in response to a failure of the at least one local server.

7. The system as recited in claim 1, wherein the at least one local server further comprises a station server, the station server, in response to a failure of the at least one cloud server, processing notification requests after the estimated location of the proximate wireless-enabled personal locator device is determined.

8. The system as recited in claim 1, wherein the at least one cloud server further comprises:
 a processor; and
 a memory accessible to the processor, the memory including processor-executable instructions that, when executed, cause the processor to:
  receive a plurality of gateway signals from a plurality of gateway devices of the vertical and horizontal array via the at least one local server,
  process the plurality of gateway signals,
   determine estimated location of the proximate wireless-enabled personal locator device, and
  activate an alert notification.

9. A system for providing awareness in a multi-space environment, the system comprising:
 an array of gateway devices, each gateway device being positioned within a space in the multi-space environment, each gateway device having a gateway device identification providing an accurately-known fixed location;
 each gateway device of the array including:
  a housing,
  a wireless transceiver associated with the housing,
  a processor located within the housing and coupled to the wireless transceiver,
  a memory accessible to the processor, the memory including processor-executable instructions that, when executed, cause the processor to:
   receive a beacon signal via the wireless transceiver from a proximate wireless-enabled personal locator device, the beacon signal including a personal locator device identification,
   measure a signal characteristic of the beacon signal,
   transmit a gateway signal to a server system, the gateway signal including the personal locator device identification, the gateway device identification, and received signal strength measurement;
 the server system located in communication with the array of gateway devices, the server system processing the plurality of gateway signals to determine an estimated location of the proximate wireless-enabled personal locator device;
 the server system including at least one local server co-located in communication with the array of gateway devices at the multi-space environment;
 the server system including at least one cloud server remotely located in communication with the at least one local server; and
 the at least one local server of the server system processes the plurality of gateway signals to determine an estimated location of the proximate wireless-enabled personal locator device, in response to a failure of the at least one cloud server.

10. The system as recited in claim 9, wherein the server system further comprises redundancy at each of the at least one local server and the cloud server in response to a failure.

11. The system as recited in claim 9, wherein the at least one local server co-located in communication with the array of gateway devices further comprises at least one primary server and at least one secondary server, the secondary server taking over for the primary server in response to a failure of the primary server.

12. The system as recited in claim 9, wherein the at least one local server co-located in communication with the array of gateway devices further comprises a plurality of local servers, the plurality of local servers sharing load and rebalancing the load in response to a failure of one of the plurality of local servers.

13. The system as recited in claim 9, wherein the array of gateway devices proxy communications through the at least one local server to the at least one cloud server.

14. The system as recited in claim 9, wherein the array of gateway devices proxy communications through the at least one local server to the at least one cloud server, the array of gateway devices proxying communications directly to the at least one cloud server in response to a failure of the at least one local server.

15. The system as recited in claim 9, wherein the at least one local server further comprises a station server, the station server, in response to a failure of the at least one cloud server, processing notification requests after the estimated location of the proximate wireless-enabled personal locator device is determined.

16. A system for providing awareness in a multi-space environment, the system comprising:
- an array of gateway devices, each gateway device being positioned within a space in the multi-space environment, each gateway device having a gateway device identification providing an accurately-known fixed location;
- each gateway device of the array configured to measure a signal characteristic of a received beacon signal from a proximate wireless-enabled personal locator device and, responsive thereto, to transmit a gateway signal to a server system, the gateway signal including the personal locator device identification, the gateway device identification, and received signal strength measurement;
- the server system located in communication with the array of gateway devices, the server system processing the plurality of gateway signals to determine an estimated location of the proximate wireless-enabled personal locator device;
- the server system including at least one local server co-located in communication with the array of gateway devices at the multi-space environment;
- the server system including at least one cloud server remotely located in communication with the at least one local server; and
- the at least one local server of the server system processes the plurality of gateway signals to determine an estimated location of the proximate wireless-enabled personal locator device, in response to a failure of the at least one cloud server.

17. The system as recited in claim 16, wherein the server system further comprises redundancy at each of the at least one local server and the cloud server in response to a failure.

* * * * *